(12) United States Patent
Ohta et al.

(10) Patent No.: US 11,652,242 B2
(45) Date of Patent: May 16, 2023

(54) SOLID-STATE BATTERY ELECTROLYTE LAYERS

(71) Applicant: HONDA MOTOR CO., LTD., Tokyo (JP)

(72) Inventors: Masahiro Ohta, Saitama (JP); Takuya Taniuchi, Saitama (JP)

(73) Assignee: Honda Motor Co., LTD., Tokyo (JP)

( * ) Notice: Subject to any disclaimer, the term of this patent is extended or adjusted under 35 U.S.C. 154(b) by 214 days.

(21) Appl. No.: 17/147,479

(22) Filed: Jan. 13, 2021

(65) Prior Publication Data
US 2021/0226258 A1 Jul. 22, 2021

(30) Foreign Application Priority Data
Jan. 17, 2020 (JP) .............................. JP2020-006145

(51) Int. Cl.
*H01M 10/0585* (2010.01)
*H01M 10/0525* (2010.01)
*H01M 4/02* (2006.01)

(52) U.S. Cl.
CPC ... *H01M 10/0585* (2013.01); *H01M 10/0525* (2013.01); *H01M 2004/021* (2013.01)

(58) Field of Classification Search
CPC ......... H01M 10/0585; H01M 10/0525; H01M 2004/021; H01M 10/0562; H01M 10/0565; Y02E 60/10; Y02P 70/50; B60R 16/033

USPC ......................................................... 429/162
See application file for complete search history.

(56) References Cited

FOREIGN PATENT DOCUMENTS

DE    112017004924 T5 *  7/2019  .......... H01M 10/052
JP    2013182842 A       9/2013

* cited by examiner

*Primary Examiner* — Gary D Harris
(74) *Attorney, Agent, or Firm* — CKC & Partners Co., LLC

(57) ABSTRACT

To provide a solid-state battery allowing the yield of the solid-state battery to be improved and further the durability of the solid-state battery to be improved. A solid-state battery (10) includes a positive electrode layer (3) containing a positive electrode active material, a negative electrode layer (2) containing a negative electrode active material, and a solid electrolyte (1) interposed between the positive electrode layer (3) and the negative electrode layer (2). The solid electrolyte (1) includes a positive electrode-side electrode layer (1*a*) in contact with the positive electrode layer (3) and a negative electrode-side electrolyte layer (1*b*) in contact with the negative electrode layer (2). In the solid electrolyte (1), an area $S_{SE2}$ of the positive electrode side of the positive electrode-side electrolyte layer (1*a*) differs from an area $S_{SE1}$ off the negative electrode side of the negative electrode-side electrolyte layer (1*b*).

13 Claims, 6 Drawing Sheets

SOLID-STATE BATTERY ELECTROLYTE LAYERS

BACKGROUND OF THE INVENTION

This application is based on and claims the benefit of priority from Japanese Patent Application 2020-006145, filed on 17 Jan. 2020, the content of which is incorporated herein by reference.

FIELD OF THE INVENTION

The present invention relates to a solid-state battery.

RELATED ART

Recently, the demand for batteries with high capacity and high output has rapidly expanded due to the spread of various electric and electronic devices of various sizes such as automobiles, personal computers, and mobile phones. Examples of such batteries include a liquid battery that includes an organic electrolytic solution as an electrolyte between a positive electrode and a negative electrode, and a solid-state battery that includes a solid electrolyte instead of an electrolyte of an organic electrolytic solution.

Since solid electrolytes are nonflammable, there is no risk of leakage or ignition, and they are chemically more stable than organic electrolytic solutions, solid-state batteries including solid electrolytes simplify safety devices and have attractive manufacturing costs and excellent productivity.

For example, Patent Document 1 discloses a technique relating to a solid-state battery in which side surfaces of an electrode layer and a solid electrolyte layer are inclined with respect to the layer thickness direction. According to Patent Document 1, this solid-state battery is unlikely to suffer from a short circuit even if the thickness is reduced and the capacity is increased.

Patent Document 1: Japanese Unexamined Patent Application, Publication No. 2013-182842

SUMMARY OF THE INVENTION

The solid-state battery including the solid electrolyte is subjected to an integrated press process in which the electrodes and solid electrolyte are pressed together by pressing, and an aging process in which the solid-state battery that has undergone the integrated press process is allowed to stand for a predetermined period of time while being charged.

At this time, the electrode layers repeatedly expand and contract by the press process and aging process. Since the positive electrode layer containing a positive electrode active material and the negative electrode layer containing a negative electrode active material differ from each other in the expansion and contraction coefficients, delamination may occur at the interface of the layer constituting the solid-state battery, or breakage may occur in the solid electrolyte interposed between the positive electrode layer and the negative electrode layer, due to differences in the expansion and contraction coefficients, and thus the yield of the solid-state battery may be decreased. Further, even during normal charging, since the positive electrode layer and the negative electrode layer repeatedly expand and contract in the same manner as in the aging process, the same issues may occur, causing an issue with the durability of the solid-state battery.

In the solid-state battery disclosed in Patent Document 1, the solid electrolyte layer is composed of one layer, and thus, the solid-state battery does not have a structure capable of sufficiently solving decreases in the yield and durability of the solid-state battery due to differences in the expansion and contraction coefficients of the electrode layers.

An object of the present invention is to improve the yield of a solid-state battery, and further, to improve the durability of the solid-state battery.

To solve the above problems, the inventors have extensively studied and have found that the above problems can be solved by using a plurality of layers as a solid electrolyte interposed between a positive electrode layer and a negative electrode layer, and configuring the area of the side in contact with the positive electrode and the area of the side in contact with the negative electrode, of the plurality of layers of the solid electrolyte to differ from each other, leading to the completion of the present invention.

The present invention provides a solid-state battery, including a positive electrode layer containing a positive electrode active material, a negative electrode layer containing a negative electrode active material, and a solid electrolyte interposed between the positive electrode layer and the negative electrode layer. The solid electrolyte includes a positive electrode-side electrolyte layer in contact with the positive electrode layer and a negative electrode-side electrolyte layer in contact with the negative electrode layer. In the solid electrolyte, an area $S_{SE2}$ of the positive electrode side of the positive electrode-side electrolyte layer differs from an area $S_{SE1}$ of the negative electrode side of the negative electrode-side electrolyte layer.

This can improve the yield of the solid-state battery and further can improve the durability of the solid-state battery.

The area $S_{SE1}$ of the negative electrode side of the negative electrode-side electrolyte layer may be larger than the area $S_{SE2}$ of the positive electrode side of the positive electrode-side electrolyte layer.

The thickness of the negative electrode-side electrolyte layer may be smaller than that of the positive electrode-side electrolyte layer.

The thickness of the negative electrode-side electrolyte layer may be 50 nm or more.

An intermediate electrolyte layer may be included between the positive electrode-side electrolyte layer and the negative electrode-side electrolyte layer. The area of the positive electrode side of the intermediate electrolyte layer and the area of the negative electrode side of the intermediate electrolyte layer may be respectively larger than the area $S_{SE2}$ and the area $S_{SE1}$. The ends of at least one layer constituting the solid electrolyte may be chamfered.

According to the present invention, it is possible to improve the yield of the solid-state battery, and further, to improve the durability of the solid-state battery.

BRIEF DESCRIPTION OF THE DRAWINGS

FIGS. 1A, 1B1, and 1B2 are schematic diagrams of a solid-state battery 10 according to the present embodiment;

FIGS. 2A, 2B1, and 2B2 are schematic diagrams of a solid electrolyte 1 included in the solid-state battery 10 in FIGS. 1A, 1B1, and 1B2;

FIGS. 5A, 5B1, and 5B2 are schematic diagrams of a solid electrolyte according to another aspect different from the solid electrolyte in FIGS. 2A, 2B1, and 2B2 and in which the ends of a positive electrode-side electrolyte layer are chamfered; and FIGS. 6A, 6B1, and 6B2 are schematic diagrams of a solid electrolyte according to another aspect different from the solid electrolyte in FIGS. 2A, 2B1, and 2B2 and that further includes an intermediate electrolyte layer between a positive electrode-side electrolyte layer and a negative electrode-side electrolyte layer.

DETAILED DESCRIPTION OF THE INVENTION

Specific embodiments of the present invention will be described below in detail, but the present invention is not limited to the following embodiments, and can be modified as appropriate within the scope of the object of the present invention. In this specification, when expressed as "X to Y" (X and Y are any numerical values), it means "X or more and Y or less" unless otherwise specified.

Summary of Solid-State Battery

A solid-state battery of the present invention includes a positive electrode layer, a negative electrode layer, and a solid electrolyte layer interposed therebetween. The solid electrolyte includes a positive electrode-side electrolyte layer in contact with the positive electrode layer and a negative electrode-side electrolyte layer in contact with the negative electrode layer. In the solid electrolyte, the area of the positive electrode side of the positive electrode-side electrolyte layer in contact with the positive electrode layer differs from the area of the negative electrode side of the negative electrode-side electrolyte layer in contact with the negative electrode layer.

Note that the term "solid electrolyte" as used herein refers to an aggregate of layers, including a plurality of layers including a positive electrode-side electrolyte layer and a negative electrode-side electrolyte layer, and is distinguished from solid electrolyte materials that may be included in electrodes, etc.

Figure 1A:
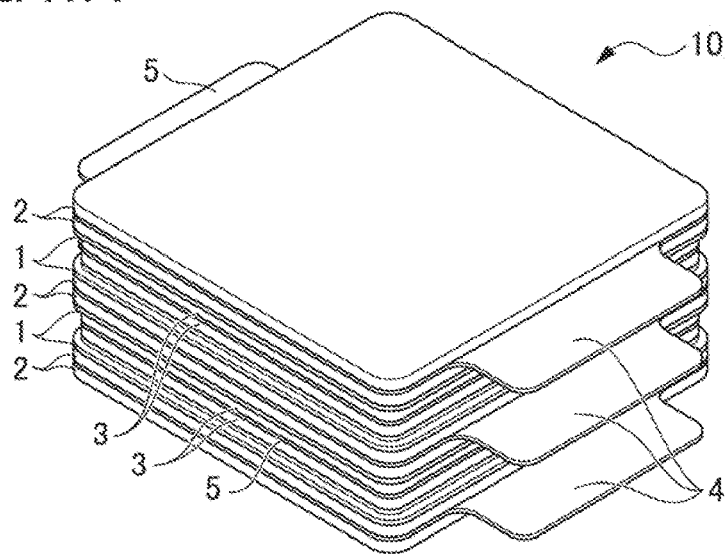
Figure 1A:
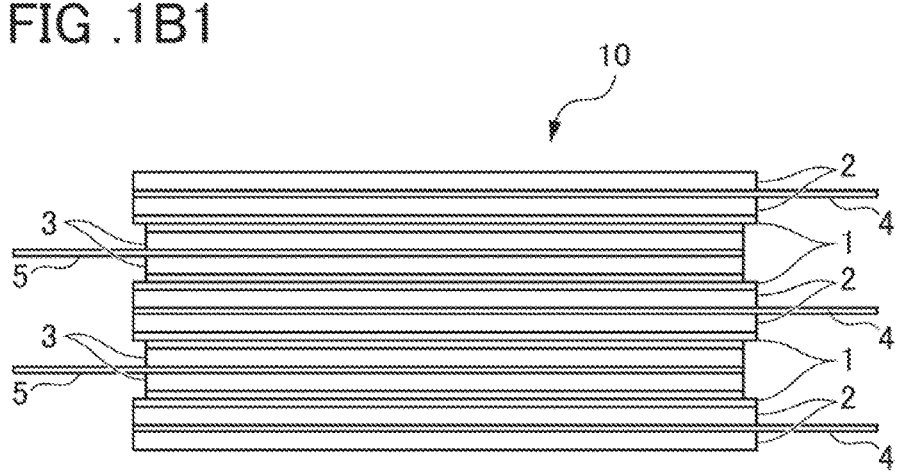
Figure 1A:
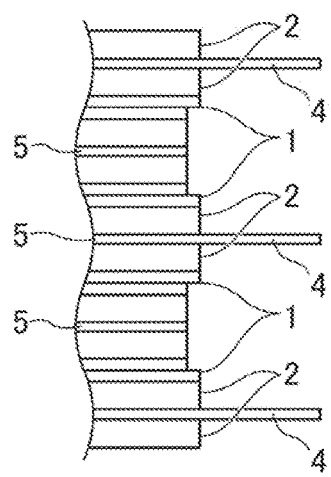
Figure 2A:
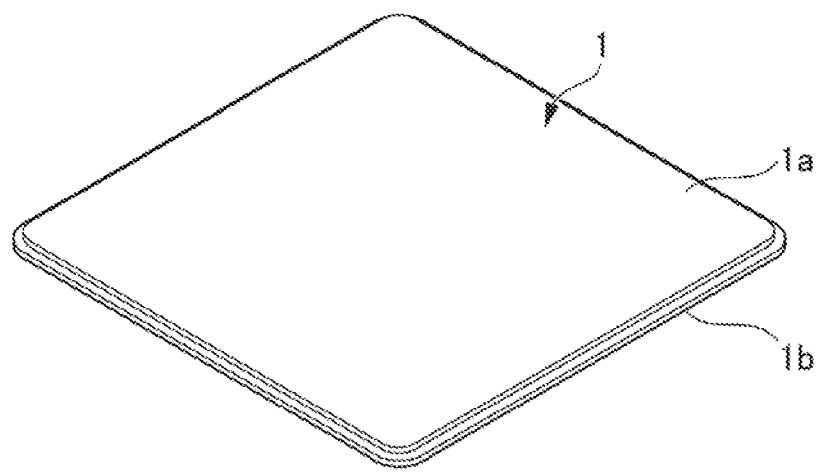
Figure 2A:
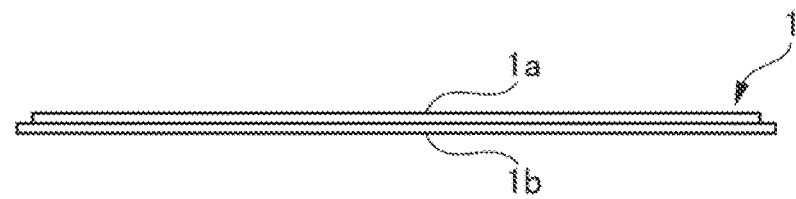
Figure 2A:
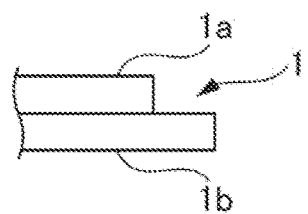
Figure 3A:
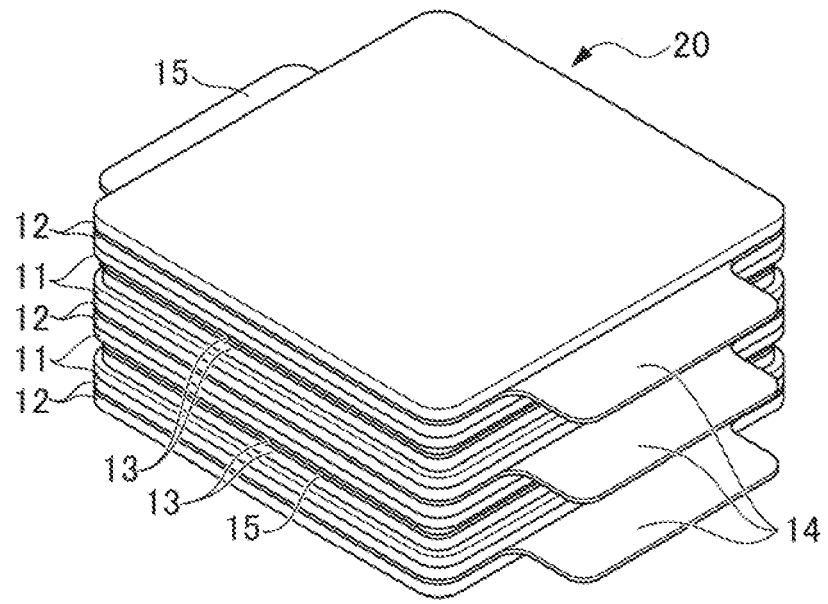
FIGS. 3A and 3B are schematic diagrams of a conventional solid-state battery 20.
Figure 3B:
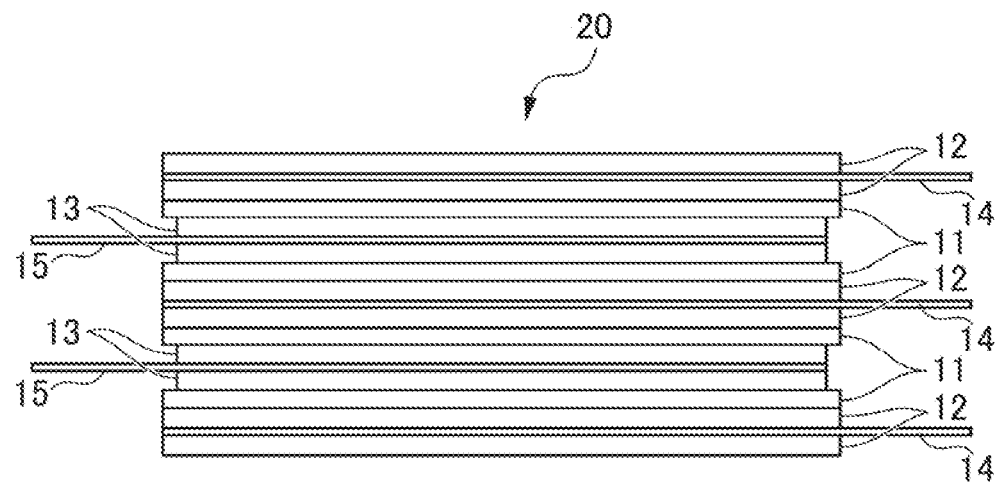

The positive electrode layer and the negative electrode layer are not necessarily laminated to have the same area, and for example, as shown in FIGS. 3A and 3B, the area of the negative electrode layer may be configured to be larger than the area of the positive electrode layer. This may suppress displacement between each layer and a short circuit of the electrode.

As shown in FIGS. 3A and 3B, when the area of the negative electrode layer is configured to be larger than the area of the positive electrode layer, and the area of the negative electrode layer and the area of the solid electrolyte layer are set to be the same as each other, the area of the positive electrode layer is inevitably smaller than the area of the solid electrolyte layer. In this case, it has been clarified by the studies of the inventors that, due to a difference in hardness or behavior such as expansion or contraction between the solid electrolyte layer and the positive electrode layer, these layers crack when laminated and bonded together or during charging and discharging, or delamination occurs between the layers.

Therefore, since the solid electrolyte layer is configured to include a plurality of layers including a positive electrode-side electrolyte layer and a negative electrode-side electrolyte layer, and the solid electrolyte is configured such that the area of the positive electrode side of the positive electrode-side electrolyte layer in contact with the positive electrode layer and the area of the negative electrode side of the negative electrode-side electrolyte layer in contact with the negative electrode layer differ from each other, it is possible to suppress cracking of the layers and delamination between the layers, thereby improving the yield of the solid-state battery and further improving the durability of the solid-state battery.

The solid-state battery of the present invention will be described using a solid-state battery 10 which is an embodiment of the present invention. Note that the solid-state battery 10 described in the following embodiment is configured by stacking a plurality of solid-state battery cells. The solid-state battery cell includes a positive electrode layer, a negative electrode layer, and a solid electrolyte. However, the solid-state battery of the present invention is not limited to the solid-state battery 10 of the following embodiment, and for example, may include a single solid-state battery cell, or may include a plurality of solid-state battery cells stacked on one another and include an insulator (insulating layer) between each solid-state battery cell.

As will be described later, in the embodiment, it is assumed that the volume change rate of the negative electrode layer is larger than that of the positive electrode layer, but the solid-state battery of the present invention is not limited to the solid-state battery 10 of the embodiment. When the volume change rate of the positive electrode layer is larger than that of the negative electrode layer, the area of the positive electrode side of the positive electrode-side electrolyte layer may be larger than that of the negative electrode side of the negative electrode-side electrolyte layer.

Solid-State Battery

As shown in FIGS. 1A, 1B1, and 1B2, in the solid-state battery 10 according to the embodiment, a plurality of solid-state battery cells is stacked, and electrode layers (negative electrode layers 2 or positive electrode layers 3) and solid electrolytes 1 are alternately stacked. Since no insulator is included between each solid-state battery cell, the energy density is higher than that of a solid-state battery with an insulator. Current collecting tabs 4 and 5 are respectively connected to the negative electrode layer 2 and the positive electrode layer 3, and the current collecting tabs 4 and 5 extend from an end surface of the solid-state battery cell so that electricity can be taken out from the current collecting tabs 4 and 5.

The solid-state electrolyte 1 includes two layers, i.e., a positive electrode-side electrolyte layer 1a and a negative electrode-side electrolyte layer 1b (see FIGS. 2A, 2B1, and 2B2), and the area of the negative electrode side of the negative electrode-side electrolyte layer 1b is larger than that of the positive electrode side of the positive electrode-side electrolyte layer 1a.

Figure 4A:
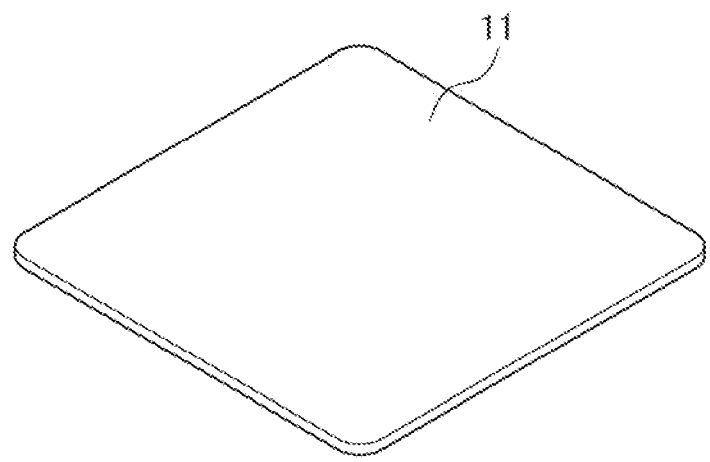
FIGS. 4A and 4B are schematic diagrams of a solid electrolyte 11 included in the solid-state battery 20 in FIGS. 3A and 3B.
Figure 4B:
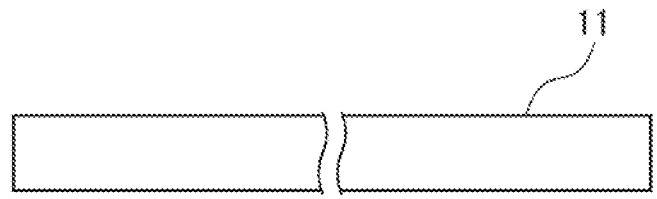

In this embodiment, it is assumed that the volume change rate of the negative electrode layer 2 containing a negative electrode active material is larger than that of the positive electrode layer 3 containing a positive electrode active material. For example, if a solid electrolyte 11 included in a solid-state battery 20 shown in FIGS. 3A and 3B is a single layer and the areas of the positive electrode side and the negative electrode side of the solid electrolyte 11 are the same (see FIGS. 4A and 4B), delamination may occur at the layer interface or breakage of the solid electrolyte 11 may occur due to the difference in the volume change rate between a positive electrode layer 13 and a negative electrode layer 12, which may reduce the yield of the solid-state battery or the durability of the solid-state battery.

Therefore, as in the solid electrolyte in FIGS. 2A, 2B1, and 2B2, two layers of the positive electrode-side electrolyte layer 1a and the negative electrode-side electrolyte layer 1b constitute the solid electrolyte. An area $S_{SE1}$ of the negative electrode side of the negative electrode-side electrolyte layer in contact with the negative electrode layer having a larger volume expansion coefficient is made to be larger than an area $S_{SE2}$ of the positive electrode side of the positive electrode-side electrolyte layer in contact with the positive electrode layer having a smaller volume expansion coefficient, i.e., $S_{SE2} < S_{SE1}$, thereby effectively suppressing delamination at the layer, interface and breakage of the solid electrolyte.

The ratio ($S_{SE1}:S_{SE2}$) of the area $S_{SE1}$ of the negative electrode layer side of the negative electrode-side electrolyte layer to the area $S_{SE2}$ of the positive electrode layer side of the positive electrode-side electrolyte layer is preferably 1.002:1 to 1.5:1, more preferably 1.01:1 to 1.1:1.

An area $S_{CA}$ of the positive electrode-side electrolyte layer side of the positive electrode layer 3 and an area $S_{AN}$ of the negative electrode-side electrolyte layer side of the negative electrode layer 2 are not particularly limited, but preferably satisfy the relationship $S_{CA} \leq S_{SE2} < S_{SE1} \leq S_{AN}$, and as shown in FIGS. 2A, 2B1, and 2B2, more preferably $S_{SE2} < S_{SE1}$, $S_{CA}$ and $S_{SE2}$ are substantially the same, and $S_{AN}$ and $S_{SE1}$ are substantially the same (i.e., $S_{CA} = S_{SE2} < S_{SE1} = S_{AN}$).

Although the thicknesses of the positive electrode-side electrolyte layer 1a and the negative electrode-side electrolyte layer 1b are not particularly limited, in the present embodiment assuming that the negative electrode layer 2 has a larger volume change rate than the positive electrode layer 3 when the solid-state battery is charged and discharged, it is preferred that the thickness of the negative electrode-side electrolyte layer 1b in contact with the negative electrode layer 2 having a larger volume change rate is smaller than that of the positive electrode-side electrolyte layer 1a in contact with the positive electrode layer 3 having a smaller volume change rate. By making the thickness of the negative electrode-side electrolyte layer 1b smaller, the volume of the negative electrode-side electrolyte layer 1b can change according to a change in volume of the negative electrode layer 2, and delamination occurring at the interface of the layer constituting the solid-state battery can be more effectively suppressed. In addition, the resistance inside the solid-state battery is reduced, and the output density of the battery is improved.

Specifically, the thickness of the negative electrode-side electrolyte layer is preferably 50 nm or more, and preferably 100 μm or less. The thickness of the positive electrode-side electrolyte layer is preferably 50 nm or more, and preferably 100 μm or less. This structure can more effectively suppress delamination at the layer interface and breakage of the solid electrolyte.

Next, each layer constituting the solid-state battery according to the embodiment will be described.

Solid Electrolyte

The solid electrolyte includes a positive electrode-side electrolyte layer and a negative electrode-side electrolyte layer. These layers are laminated between the positive electrode and the negative electrode and contain at least a solid electrolyte material. Ionic conduction (e.g., lithium ion conduction) can be performed between the positive electrode active material and the negative electrode active material via the solid electrolyte material contained in these layers.

The solid electrolyte material is not particularly limited as long as it has ionic conductivity (e.g., lithium ion conductivity), and may include, for example, a sulfide solid electrolyte material, an oxide solid electrolyte material, a nitride solid electrolyte material, and a halide solid electrolyte material, and among these, a sulfide solid electrolyte material is preferred. This is because the ionic conductivity of a sulfide solid electrolyte material is higher than that of an oxide solid electrolyte material.

The positive electrode-side electrolyte layer and the negative electrode-side electrolyte layer may be made of the same material or different materials as long as they have iconic conductivity.

Positive Electrode

The positive electrode is disposed with a positive electrode current collector and positive electrode layers formed on both surfaces of the positive electrode current collector.

The positive electrode, current collector layer is not particularly limited as long as it has a function of collecting current of the positive electrode layer, and may include, for example, aluminum, an aluminum alloy, stainless steel, nickel, iron, and titanium, and among these, aluminum, an aluminum alloy, and stainless steel are preferred. Examples of the shape of the positive electrode collector include a foil shape, a plate shape, a mesh shape, and a foam shape, and among these, a foil shape is preferred.

The positive electrode layer contains at least a positive electrode active material. As the positive electrode active material, a conventionally known material capable of releasing and occluding ions (e.g., lithium ions) may be appropriately selected and used. Specific examples of the positive electrode active material include lithium cobaltate (LiCoO$_2$), lithium nickelate (LiNiO$_2$), LiNi$_p$Mn$_q$Co$_r$O$_2$ (p+q+r=1), LiNi$_p$Al$_q$Co$_r$O$_2$ (p+q+r=1), lithium manganate (LiMn$_2$O$_4$), heterogenous element-substituted Li—Mn spinel represented by Li$_{1+x}$Mn$_2$−x−yM$_y$O$_4$ (x+y=2, M is at least one selected from Al, Mg, Co, Fe, Ni, and Zn), and lithium metal phosphate (LiMPO$_4$, M is at least one selected from Fe, Mn, Co, and Ni).

Negative Electrode

The negative electrode includes a negative electrode current collector and negative electrode layers formed on both surfaces of the negative electrode current collector.

The negative electrode current collector is not particularly limited as long as it has a function of collecting current in the negative electrode layer. Examples of the material of the negative electrode current collector include nickel, copper, and stainless steel. Examples of the shape of the negative electrode collector include a foil shape, a plate shape, a mesh shape, and a foam shape, and among these, a foil shape is preferred.

The negative electrode layer contains at least a negative electrode active material. The negative electrode active material is not limited as long as it can release and occlude ions (e.g., lithium ions), and examples thereof include lithium transition metal oxides such as lithium titanate (Li$_4$Ti$_5$O$_{12}$), transition metal oxides such as TiO$_2$, Nb$_2$O$_3$, and WO$_3$, metal sulfides, metal nitrides, carbon materials such as graphite, soft carbon, and hard carbon, metallic lithium, metallic indium, and lithium alloys. Further, the negative electrode active material may be in powder form or may be in a thin film form.

For example, the negative electrode active material made of a carbon material has a larger volume change rate due to charge and discharge as compared to a material capable of releasing and occluding lithium ions, which is used in the positive electrode active material. Therefore, the material of each layer constituting the solid-state battery of the present invention is not particularly limited, but a solid-state battery including a negative electrode layer including a negative electrode active material made of a carbon material can effectively suppress delamination at the interface of each layer and breakage of the solid electrolyte that may occur.

Other Aspects of Solid Electrolyte

Figure 5A:
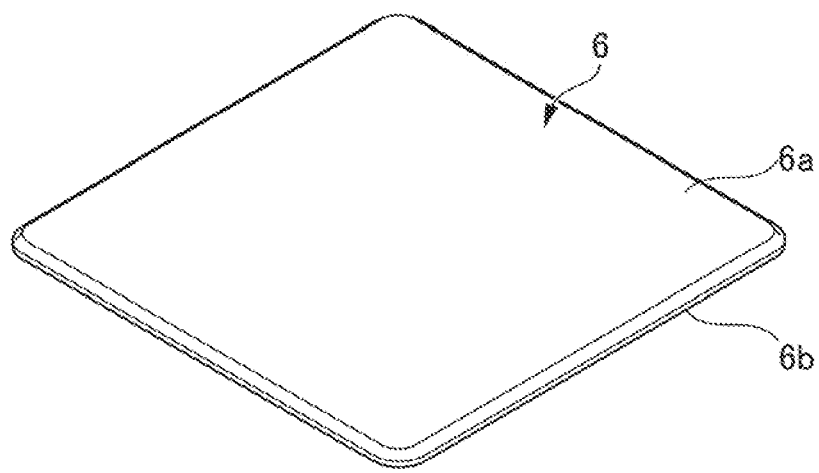
Figure 5A:
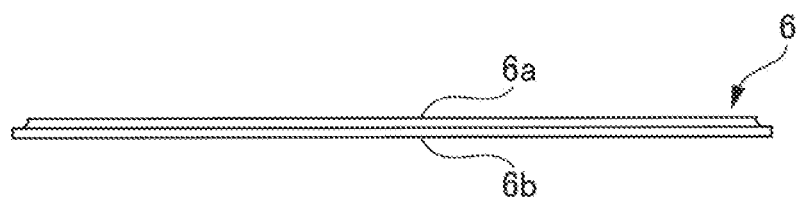
Figure 5A:
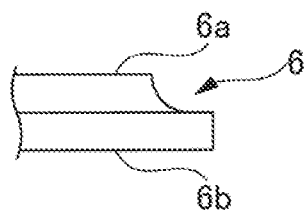
Figure 6A:
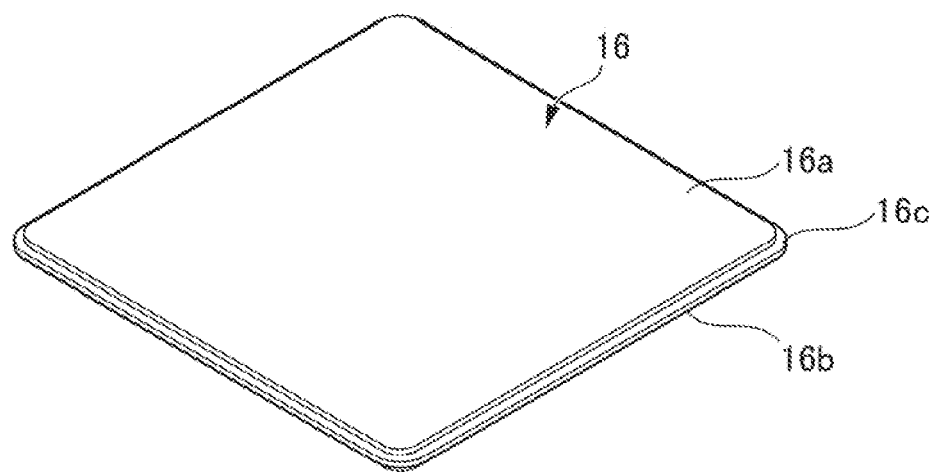
Figure 6A:
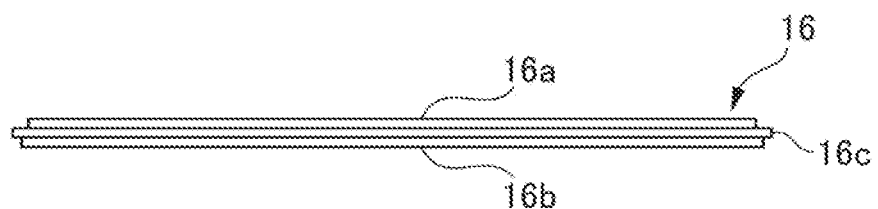
Figure 6A:
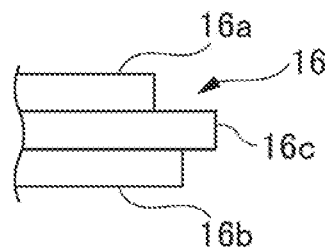

Other aspects of the solid electrolyte, which differ from the solid electrolyte in FIGS. 2A, 2B1, and 2B2, will be described with reference to FIGS. 5 and 6.

A solid electrolyte 6 in FIGS. 5A, 5B1, and 5B2 is characterized in that the ends of a positive electrode-side electrolyte layer 6a constituting the solid electrolyte are chamfered. Since the ends of at least one layer constituting the solid electrolyte are chamfered, it is possible to more effectively reduce the stress on the solid electrolyte due to differences in the expansion and contraction coefficients between the positive electrode layer and the negative electrode layer. Thus, the durability of a solid-state battery with a solid electrolyte in which the ends of at least one layer are chamfered is improved.

The chamfer may be an R chamfer (fillet) having an R surface whose ends are rounded in an arc shape, or a C chamfer (chamfer) having a tapered surface. For example, an R chamfer and a C chamfer may be combined so that the ends of the positive electrode-side electrolyte layer are R-chamfered and the ends of the negative electrode-side electrolyte layer are C-chamfered.

A solid electrolyte 16 in FIGS. 6A, 6B1, and 6B2 further includes an intermediate electrolyte layer 16c between a positive electrode-side electrolyte layer 16a and a negative electrode-side electrolyte layer 16b, and is characterized in that the area of the positive electrode side of the intermediate electrolyte layer and the area of the negative electrode side of the intermediate electrolyte layer are respectively larger than the area $S_{SE2}$ of the positive electrode side of the positive electrode-side electrolyte layer and the area $S_{SE1}$ of the negative electrode side of the negative electrode-side electrolyte layer. Each layer constituting the solid electrolyte is formed by punching or the like. The above structure can more effectively suppress a short circuit of the electrode due to burrs that may be generated by punching or the like.

Also, in the solid-state battery including the intermediate electrolyte layer, the ends of a layer constituting the solid electrolyte may be chamfered.

Method of Manufacturing Solid-State Battery

The method of manufacturing the solid-state battery 10 according to the embodiment is not particularly limited, and for example, each layer may be laminated and pressed so that the structure in FIGS. 1A, 2B1, and 1B2 is achieved. For example, in advance, two sheet-like solid electrolyte membranes may be laminated to manufacture the solid electrolyte 1 including the positive electrode-side electrolyte layer 1a and the negative electrode-side electrolyte layer 1b as shown in FIGS. 2A, 2B1, and 2B2, and then each layer may be laminated and pressed so that the structure in FIGS. 1A, 1B1, and 1B2 is achieved.

Further, for example, a coating agent containing a solid electrolyte material may be applied to the surface of the positive electrode layer and/or the negative electrode layer to form a coating layer of solid electrolyte, and each layer may be laminated and pressed so that the structure in FIGS. 1A, 1B1, and 1B2 is achieved. Such a method of forming a coating layer of solid electrolyte enables the solid electrolyte layer to be formed thinner compared to the method of forming a solid electrolyte by laminating sheet-like solid electrolyte membranes, and the thicknesses of the positive electrode-side electrolyte layer 1a and the negative electrode-side electrolyte layer 1b can be easily controlled.

As described above, the solid-state battery of the present invention can improve the yield of the solid-state battery, and further, can improve the durability of the solid-state battery.

EXPLANATION OF REFERENCE NUMERALS 10 solid-state battery
1 solid electrolyte
1a positive electrode-side electrolyte layer
1b negative electrode-side electrolyte layer
2 negative electrode layer
3 positive electrode layer
4 current collecting tab
5 current collecting tab
20 solid-state battery (conventional solid-state battery)
11 solid electrolyte (conventional solid electrolyte)
12 negative electrode layer
13 positive electrode layer
14 current collecting tab
15 current collecting tab
6 solid electrolyte
6a positive electrode-side electrolyte layer
6b negative electrode-side electrolyte layer
16 solid electrolyte
16a positive electrode-side electrolyte layer
16b negative electrode-side electrolyte layer
16c intermediate electrolyte layer

What is claimed is:
1. A solid-state battery, comprising:
a positive electrode layer containing a positive electrode active material;
a negative electrode layer containing a negative electrode active material; and
a solid electrolyte interposed between the positive electrode layer and the negative electrode layer,
the solid electrolyte comprising: a positive electrode-side electrolyte layer in contact with the positive electrode layer; and a negative electrode-side electrolyte layer in contact with the negative electrode layer,
wherein, in the solid electrolyte, an area $S_{SE2}$ of a positive electrode layer side of the positive electrode-side electrolyte layer differs from an area $S_{SE1}$ of a negative electrode layer side of the negative electrode-side electrolyte layer,
wherein the area $S_{SE1}$ of the negative electrode layer side of the negative electrode-side electrolyte layer is larger than the area $S_{SE2}$ of the positive electrode layer side of the positive electrode-side electrolyte layer, and
wherein a ratio ($S_{SE1}:S_{SE2}$) of the area $S_{SE1}$ of the negative electrode layer side of the negative electrode-side elec- trolyte layer to the area $S_{SE2}$ of the positive electrode layer side of the positive electrode-side electrolyte layer is 1.002:1 to 1.5:1.

2. The solid-state battery according to claim 1, wherein the area $S_{SE1}$ of the negative electrode side of the negative electrode-side electrolyte layer is larger than the area $S_{SE2}$ of the positive electrode side of the positive electrode-side electrolyte layer.

3. The solid-state battery according to claim 2, wherein a thickness of the negative electrode-side electrolyte layer is smaller than that of the positive electrode-side electrolyte layer.

4. The solid-state battery according to claim 3, wherein the thickness of the negative electrode-side electrolyte layer is 50 nm or more.

5. The solid-state battery according to claim 1,
wherein an intermediate electrolyte layer is included between the positive electrode-side electrolyte layer and the negative electrode-side electrolyte layer, and
wherein an area of the positive electrode layer side of the intermediate electrolyte layer and an area of the negative electrode layer side of the intermediate electrolyte layer are respectively larger than the area $S_{SE2}$ and the area $S_{SE1}$.

6. The solid-state battery according to claim 1,
wherein ends of at least one layer constituting the solid electrolyte are chamfered.

7. The solid-state battery according to claim 2,
wherein an intermediate electrolyte layer is included between the positive electrode-side electrolyte layer and the negative electrode-side electrolyte layer, and
wherein an area of the positive electrode layer side of the intermediate electrolyte layer and an area of the negative electrode layer side of the intermediate electrolyte layer are respectively larger than the area $S_{SE2}$ and the area $S_{SE1}$.

8. The solid-state battery according to claim 2,
wherein ends of at least one layer constituting the solid electrolyte are chamfered.

9. The solid-state battery according to claim 3,
wherein an intermediate electrolyte layer is included between the positive electrode-side electrolyte layer and the negative electrode-side electrolyte layer, and
wherein an area of the positive electrode layer side of the intermediate electrolyte layer and an area of the negative electrode layer side of the intermediate electrolyte layer are respectively larger than the area $S_{SE2}$ and the area $S_{SE1}$.

10. The solid-state battery according to claim 3,
wherein ends of at least one layer constituting the solid electrolyte are chamfered.

11. The solid-state battery according to claim 4,
wherein an intermediate electrolyte layer is included between the positive electrode-side electrolyte layer and the negative electrode-side electrolyte layer, and
wherein an area of the positive electrode layer side of the intermediate electrolyte layer and an area of the negative electrode layer side of the intermediate electrolyte layer are respectively larger than the area $S_{SE2}$ and the area $S_{SE1}$.

12. The solid-state battery according to claim 4,
wherein ends of at least one layer constituting the solid electrolyte are chamfered.

13. The solid-state battery according to claim 5,
wherein ends of at least one layer constituting the solid electrolyte are chamfered.

* * * * *